Patented July 3, 1928.

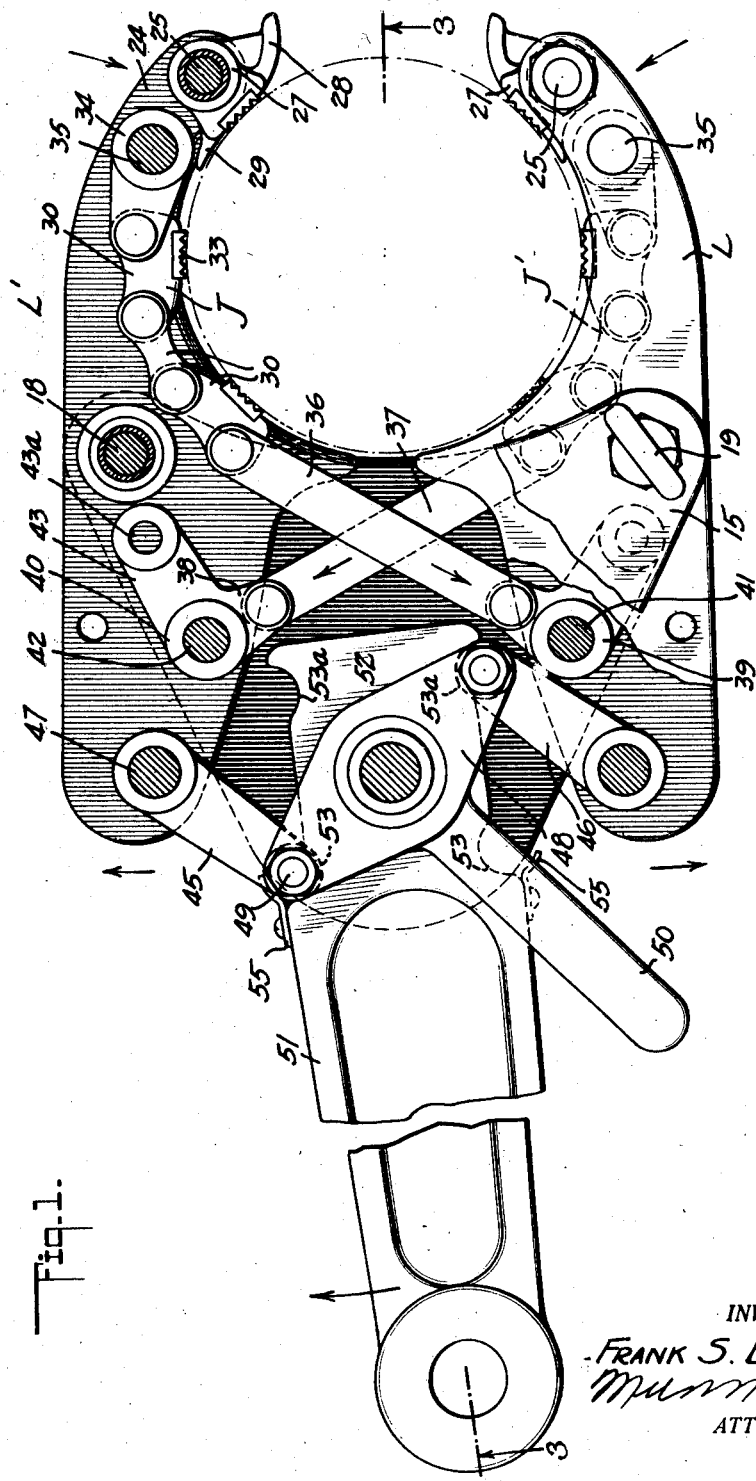

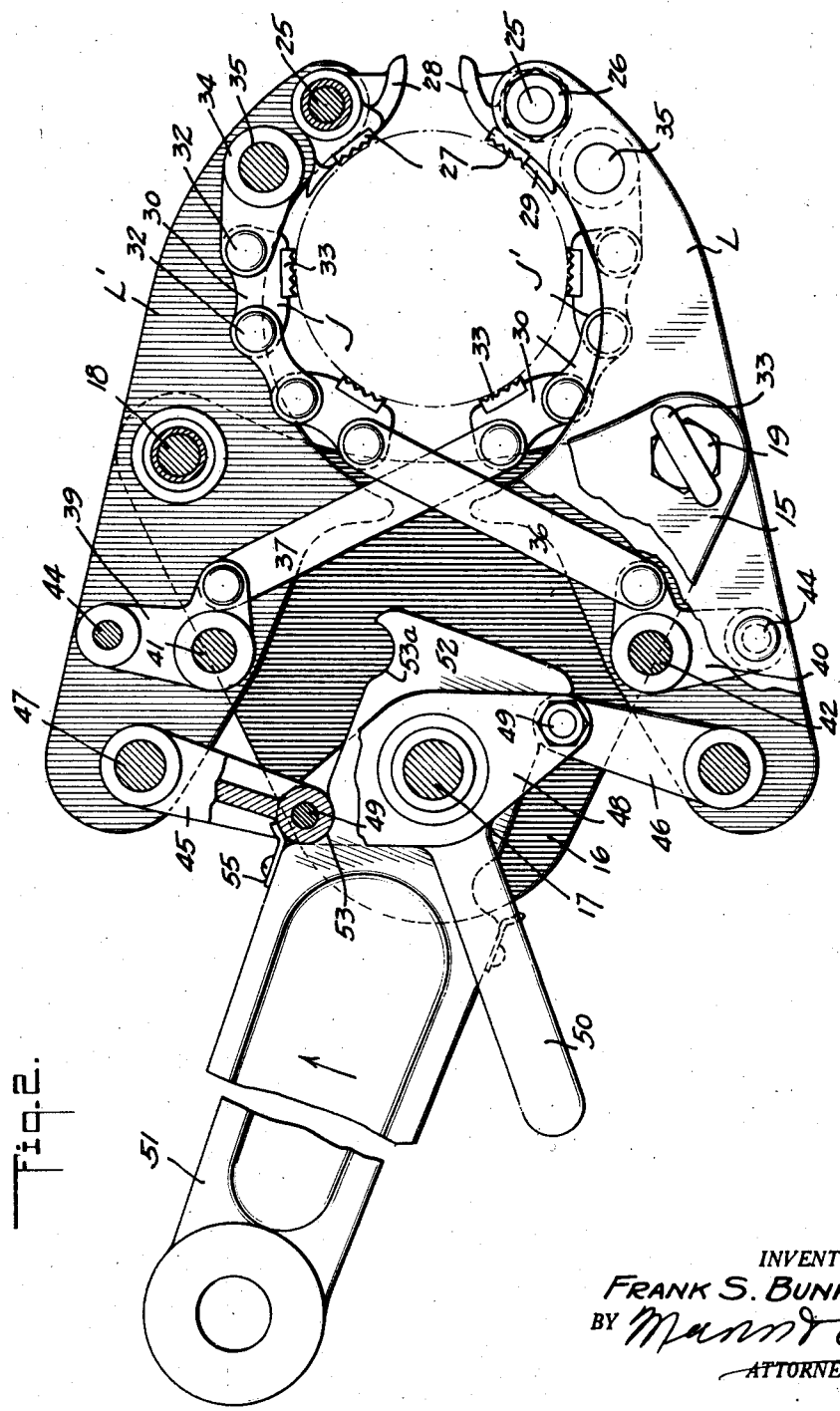

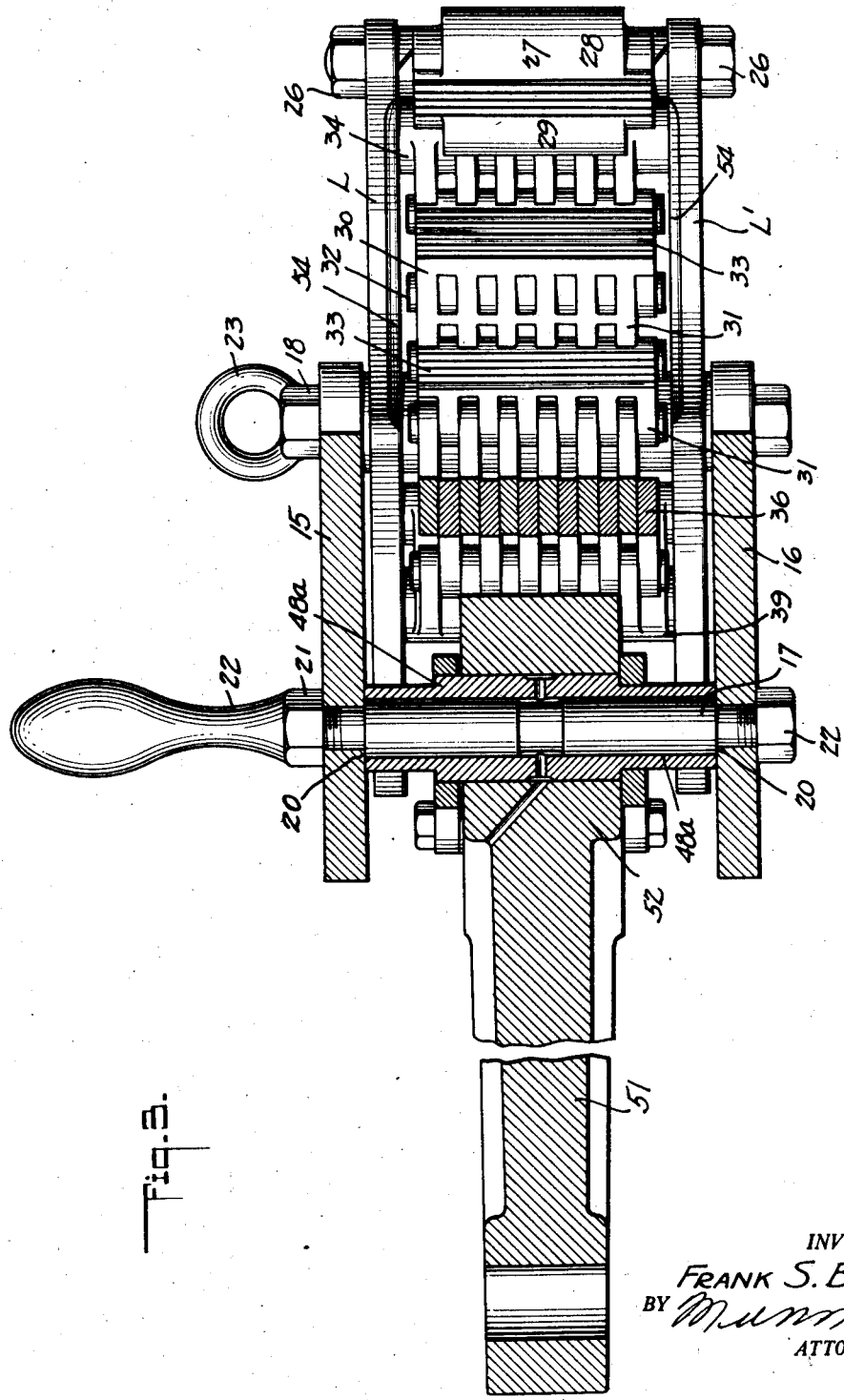

UNITED STATES PATENT OFFICE.

FRANK S. BUNKER, OF LONG BEACH, CALIFORNIA, ASSIGNOR TO JESSE W. HUGHES, OF COMPTON, CALIFORNIA.

PIPE TONGS.

Application filed May 19, 1926. Serial No. 110,211.

My invention relates to pipe tongs particularly adapted, although not necessarily, for use in screwing and unscrewing the pipe sections, couplings and tool joints of rotary drill pipes.

It is a purpose of my invention to provide a pair of pipe tongs which are applicable to pipes of widely varying diameters and capable by manipulation of coupling and uncoupling two sections of pipe without the necessity as in tongs as heretofore proposed of inverting the tongs, and in their adaptation to drill pipe being capable of screwing and unscrewing the pipe sections, couplings and tool joints of different diameter drill pipes, all without inverting the tongs.

I will describe only one form of pipe tongs embodying my invention and will then point out the novel features thereof in claims.

In the accompanying drawings,

Figure 1 is a view showing in top plan and partly in section one form of pipe tongs embodying my invention;

Figure 2 is a view similar to Figure 1, showing another position of the parts comprised in the tongs and a different adjustment thereof;

Figure 3 is a vertical sectional view taken on the line 3—3 of Figure 1.

Referring specifically to the drawings, in which similar reference characters refer to similar parts in each of the views, my invention, in its present embodiment, comprises upper and lower plates 15 and 16, respectively, of substantially triangular form rigidly connected in fixed spaced parallel relation by means of axles 17, 18 and 19, each being in the form of a rod and having ends of reduced diameter to form shoulders 20 against which the plates are secured by means of nuts 21. The upper nut for the axle 17 is provided with a handle 22, while the upper nuts for the axles 18 and 19 are formed with eyes 23 through which cables (not shown) are adapted to be extended for supporting the tongs in horizontal and elevated position to facilitate the application and removal of the tongs to or from a pipe. The handle 22 is adapted to be gripped for manually moving the tongs, as will be well understood by those skilled in the art.

The axles 18 and 19 constitute fulcrums for two pairs of levers L and L' arranged between the plates 15 and 16 and in a manner to have arcuate portions 24 extending forwardly of the plates. These levers L and L' constitute actuators for a pair of jaws indicated generally at J and J', and they operate in conjunction with other mechanism for moving the jaws to expanded or contracted position in effecting the grip or release of a pipe or other circular object. The levers of each pair are arranged one directly above the other and the free ends of the arcuate portions 24 are rigidly connected by a rod 25, the ends of which are threaded to receive nuts 26. Pivotally mounted on each rod is a subsidiary jaw 27 provided with flanges 28 and 29 for a purpose which will be described hereinafter.

As the construction of the two jaws J and J' is identical, a description of one will suffice for both. Each jaw comprises a plurality of links and each link consists of a vertically elongated body 30 provided along its longitudinal edges with a plurality of laterally extending ears 31 which are alternately arranged with respect to the ears of adjacent links so that connecting pins 32 can be extended through the ears in a manner to pivotally connect the bodies. Alternate bodies have their inner faces grooved or recessed to receive a serrated body 33 constituting a dog. The foremost link is constructed to provide a sleeve 34 through which a pin 35 extends and into the corresponding arcuate portions 24 of the levers for pivotally connecting the forward or outer end of the jaw to the levers. The rear end of the jaw J is pivotally connected to a plurality of relatively long links 36 arranged in alternate and crossed relation with respect to similar links 37 pivotally connected to the inner end of the jaw J'. The rear ends of the links 36 and 37 are connected, respectively, to the short arm 38 of bell crank levers 39 and 40 fulcrumed on pins 41 and 42, respectively, secured in the levers L and L' at the rear of the axles 18 and 19. In Figure 1, the long arms 43 of the bell crank levers 39 and 40 are free to swing, but in Figure 2 pins 44 are extended through the long arms to lock the bell crank levers against movement on the pins 41 and 42. These pins 44 engage at their ends in the levers L and L' and are capable of being readily removed to permit swinging movement of the bell crank levers.

The rear ends of the levers L and L' are capable of being moved to effect actuation of the levers and, consequently, the jaws, through the medium of a double toggle which comprises links 45 and 46 connected to the levers by pins 47 and to levers 48 by pins 49, the levers 48 being fulcrumed medially of their ends on a shouldered sleeve 48$^a$ on the axle 17 and provided with an arm 50 by which the levers can be manually actuated to reverse the position of the double toggle, as will be more fully described hereinafter. An operating arm 51 is fulcrumed on the sleeve 48$^a$, the construction of its forward or pivoted end being such as to provide a head 52 having recesses 53 and 53$^a$ in its opposite edges to receive the ends of the links 45 and 46 in moving the double toggle in one direction or the other in effecting actuation of the levers L and L' and the jaws J and J'.

The operation of the tongs is as follows: The tongs are shown in Figure 1 with the jaws J and J' in gripping relation to a pipe of one diameter, the pipe being indicated in dot-and-dash lines and of the largest diameter which the jaws are capable of accommodating and gripping. The jaws have been moved to gripping position or partly contracted position by movement of the arm 51 in the direction of the arrow to engage the ends of the links and thus exert a force on the links 45 and 46 to move the latter outwardly and inwardly, respectively, in forcing the rear ends of the levers L and L' outwardly, as indicated by the arrows. With outward movement of the rear ends of the levers, the forward ends move inward, as indicated by the arrows, and during this rocking movement of the levers the pins 41 and 42 are moved outwardly in opposite directions, and with them the bell crank levers 39 and 40, so as to draw the links 36 and 37 in the directions of the arrows and thereby draw the inner ends of the jaws J and J' outwardly along lines tangent with respect to the circle defined by the jaws. In this manner, the jaws J and J' are fed inwardly, as the forward ends of the levers L and L' move inwardly, the relation of the movements of these two elements being such that the jaws are at all times in advance of the levers. Furthermore, the degree or range of movement of the jaws exceeds that of the levers, so that the jaws are constricted into firm gripping engagement with the pipe, as illustrated in Figure 1. If it is now desired to turn the pipe in a clockwise direction, as when viewed in Figure 1, it is only necessary to continue the forward movement of the arm 51 when the jaws will function to rotate the pipe. If it is desired to rotate the pipe in the opposite direction, it is first necessary to swing arm 50 to reverse the position of the levers 48 so that the links 45 and 46 will likewise be reversed and the arm 51 when moved in the opposite direction will be caused to engage the link ends in the other recesses 53$^a$. Upon continued movement of the arm 51 in the same direction, the double toggle will be actuated to rock the levers L and L' and to simultaneously restrict the jaws J and J' into gripping engagement with the pipe, and then upon further movement the pipe can be rotated in a counter-clockwise direction. It is important to note that in rotating the pipe in one direction or the other, it is only necessary to detach the tongs from the pipe and to reverse the position of the links with respect to the pipe.

The operation of the tongs thus far described is repeated in the gripping and rotating of pipes of somewhat smaller diameters, the parts of the tongs being designed so as to be effective in operation with respect to pipes of various diameters within a limited range and after adjustment of the bell crank levers 39 and 40. Its range of use after adjustment is such as to include pipe sections of the drill pipe of a given diameter, as well as its couplings and tool joints, all without the necessity of inverting the position of the tongs in rotating the sections, couplings or joints in the other direction. If it is desired to handle drill pipes of slightly smaller diameters, one of the bell crank levers can be moved to the position shown in Figure 2 and secured in such position by the corresponding pins 44. In moving the bell crank lever to this position, the short arm 38 is moved inwardly to the corresponding levers L or L', thereby moving the corresponding jaw J or J' inwardly of the levers L or L' and thereby bringing it into closer relation to the other jaw in its initial or starting position. This naturally decreases the diameter of the circle defined by the jaws J and J', so that upon operation of the arm 51 the jaws can be constricted to a greater degree to grip and thus permit rotation of pipes of a smaller diameter. With this new adjustment, the jaws are adaptable to the pipe sections, couplings and tool joints of the smaller drill pipe, and these elements are capable of being rotated in one direction or the other merely by a reversal in position of the arm 50.

If desired to apply the tongs to drill pipes of a still smaller diameter, a second adjustment of the jaws J and J' can be effected by moving the other bell crank lever 39 or 40 to the new position, so that both of the bell crank levers now occupy the positions shown in Figure 2. In this manner, the other jaw J or J' is moved in closer relation to the other jaw so that the diameter of the circle defined by the two jaws is further reduced, both in the gripping and non-gripping positions. In this new adjusted position, the jaws are operable to effectively grip the pipe sections, couplings and tool joints of a smaller drill pipe and all without any further adjustment of the levers, and to rotate these elements in either direction, depending upon the position of the arm 50 and the movement of the arm 51.

In applying the tongs to a drill pipe, the flanges 29 of the subsidiary jaws 27 are positioned to be engaged by the pipe as the latter moves between the jaws J and J', so that the flanges are moved rearwardly to the position in Figure 1, and thereby causing the jaws to assume corresponding positions in which the dogs 33 thereof move into engagement with the pipe. In gripping position of the tongs, the several dogs 33 of both the jaws J and J' and the subsidiary jaws 27 have biting engagement with the outer surface of the pipe so that upon rotation of the tongs a corresponding movement is imparted to the pipe. In removing the tongs from the pipe, the flanges 28 of the subsidiary jaws 27 are engaged and moved by the pipe to swing the subsidiary jaws to released position with respect to the pipe. In this manner, the application and removal of the tongs to and from the pipe is greatly facilitated.

In the actual handling of drill pipe, the links comprising the jaws J and J' are at times extended from the levers L and L' in the process of gripping of a pipe and if the pins connecting the links are worn the links when extended will sag and thus abut the levers and fail to move into or between the levers as the jaws are contracted so that the proper gripping of a pipe is prevented. By beveling the inner edges of the levers L and L' as indicated at 54 in Figure 3, such a condition is rendered impossible because as the sagging links move inwardly of the levers the pin ends engage the beveled edges and are thus elevated or lowered as the case may be and thereby guiding the links between the levers.

In order to facilitate the expansion of the jaws to non-gripping or released position with respect to a pipe, spring clips 55 (Figure 1) can be secured to the arm 51 in overlying relation to the recesses 53 in order to releasably secure the arm to the ends of the links 45 or 46 so that as the arm 51 is returned to an intermediate position the links will be likewise returned and the jaws J and J' thus opened.

Although I have herein shown and described only one form of pipe tongs embodying my invention, it is to be understood that various changes and modifications may be made therein without departing from the spirit of the invention and the spirit and scope of the appended claims.

I claim as my invention:

1. Pipe tongs comprising a pair of flexible jaws, means for supporting the jaws for bodily movement to occupy contracted and expanded positions, means for actuating the first means, and means for drawing the jaws inwardly in opposed directions as they are moved to contracted position by the first means.

2. Pipe tongs comprising a pair of flexible jaws, means for supporting the jaws for bodily movement to occupy contracted and expanded positions, means for actuating the first means, and means for drawing the jaws tangentially with respect to a pipe between the jaws and in opposed directions to maintain the jaws extended as they are moved to contracted position.

3. Pipe tongs comprising flexible jaws, a frame, levers mounted on the frame for supporting the jaws for bodily movement to occupy contracted and expanded positions, toggles for actuating the levers, means for actuating the toggles and crossed links connecting the jaws with the levers and operating to draw the jaws tangentially with respect to a pipe between the jaws and in opposed directions.

4. Pipe tongs comprising a pair of levers, a pair of flexible jaws pivoted at one end on the levers, and means for connecting the other end of the jaws to the levers in such manner that when the levers are actuated to move the jaws toward each other, opposed pulls will be exerted on the jaws to constrict the latter in advance of the inward movements of the pivoted ends of the jaws.

5. Pipe tongs comprising a pair of levers, a pair of flexible jaws pivoted at one end on the levers, and means for connecting the other end of the jaws to the levers in such manner that when the levers are actuated to move the jaws toward each other, opposed pulls will be exerted on the jaws to constrict the latter in advance of the inward movements of the pivoted ends of the jaws, said means being adjustable to vary the fully expanded and contracted positions of the jaws and levers whereby the tongs are adaptable to pipes of various diameters.

6. Pipe tongs comprising members arranged in pairs with the members of each pair constituting a lever and spaced apart and connected for movement together, means for mounting the levers for rocking movement, flexible jaws pivoted between the members of each pair, crossed links connected with the jaws, bell crank levers fulcrumed on the first levers and connected to said links, a double toggle connecting the first levers and capable of being reversed in its position with respect to the first levers, and an actuating arm pivoted to actuate the toggle in either of its positions.

7. Pipe tongs as embodied in claim 6 wherein means is provided for adjusting and locking the bell crank levers against movement on the first levers whereby the normal position of the jaws with respect to the first levers can be varied.

8. Pipe tongs as embodied in claim 6 wherein the flexible jaws are made up of a plurality of links having serrated inserts therein.

9. Pipe tongs as embodied in claim 6 and subsidiary jaws pivoted on the levers.

10. Pipe tongs as embodied in claim 6 and subsidiary jaws pivoted on the first levers and provided with flanges adapted to be engaged by a pipe when applying or removing the tongs to or from the pipe or moving the subsidiary jaws to gripping or non-gripping position with respect to the pipe.

11. Pipe tongs comprising flexible jaws, means for supporting the jaws for bodily movement to occupy contracted and expanded positions, means for actuating the first means, and means for actuating the second means to maintain the jaws in contracted position and for rotating the tongs, the second means and the third means being adjustable to allow rotation of the tongs in one direction or the other and to maintain the jaws in contracted position during such rotation.

12. Pipe tongs comprising a frame, a pair of levers mounted in the frame, a flexible jaw connected to each of the levers, means mounted on the frame for actuating the levers to effect movement of the jaws to contracted and expanded positions, and means operatively connected to the levers and jaws operating when the jaws are moved to contracted position to exert a pull on the jaws and thereby constrict the jaws.

13. Pipe tongs comprising flexible jaws, means for supporting the jaws for bodily movement to occupy contracted and expanded positions, a toggle for actuating the first means, and an operating arm for actuating the toggle to maintain the jaws in contracted position and for rotating the tongs, said toggle being capable of being reversed in its position with respect to the actuating arm to allow rotation of the tongs in one direction or the other and to maintain the jaws in contracted position during such rotation.

14. Pipe tongs comprising flexible jaws, means for supporting the jaws for bodily movement to occupy contracted and expanded positions, a toggle for actuating the first means, an operating arm for actuating the toggle to maintain the jaws in contracted position and for rotating the tongs, and means operatively connected to the jaws and first means and operating when the jaws are moved to contracted position to exert a pull on the jaws tangentially with respect to a pipe between the jaws and thereby constrict the latter.

FRANK S. BUNKER.